United States Patent [19]
Suzuki et al.

[11] Patent Number: 5,491,532
[45] Date of Patent: Feb. 13, 1996

[54] CAMERA WITH DEVICE FOR DETECTING LINE OF SIGHT

[75] Inventors: Fumio Suzuki; Shigemasa Sato, both of Yokohama, Japan

[73] Assignee: Nikon Corporation, Tokyo, Japan

[21] Appl. No.: 305,981

[22] Filed: Sep. 19, 1994

Related U.S. Application Data

[63] Continuation of Ser. No. 115,567, Sep. 3, 1993, abandoned.

[30] Foreign Application Priority Data

Sep. 14, 1992 [JP] Japan ..................... 4-245194

[51] Int. Cl.⁶ .................................... G03B 13/02
[52] U.S. Cl. ............................ 354/410; 354/219
[58] Field of Search ............... 354/410, 62, 219, 354/288

[56] References Cited

U.S. PATENT DOCUMENTS

| | | | |
|---|---|---|---|
| 4,641,349 | 2/1987 | Flom et al. | 354/62 X |
| 5,036,347 | 7/1991 | Tsunekawa et al. | 354/62 X |
| 5,155,516 | 10/1992 | Shindo | 354/219 |
| 5,182,443 | 1/1993 | Suda et al. | 354/62 X |

FOREIGN PATENT DOCUMENTS

61-172552 8/1986 Japan.
2-5 1/1990 Japan.

*Primary Examiner*—W. B. Perkey

[57] ABSTRACT

A camera with a device for detecting the line of sight is provided with a first light source for detecting the corneal reflected image of the eye and a second light source for detecting the boundary between the pupil and the iris or between the iris and the white of the eye, thereby effecting illuminations for these purposes with optimum illumination intensities. Thus the position of the Purkinje's first image and the central position of the pupil can be detected efficiently, and the direction of the line of sight can be accurately calculated.

24 Claims, 11 Drawing Sheets

CENTER OF PUPIL $D = (d_1 + d_2)/2$

FIG. 21

CAMERA WITH DEVICE FOR DETECTING LINE OF SIGHT

This is a continuation of application Ser. No. 08/115,567 filed Sep. 3, 1993, now abandoned.

BACKGROUND OF THE INVENTION

1. Field of the Invention

The present invention relates to a camera provided with a device for detecting the line of sight of the photographer, thereby detecting the object to be taken.

2. Related Background Art

There have recently been proposed various cameras equipped with a sight line detecting device for detecting the direction of line of sight of the photographer, for use in light metering or in range finding. The methods for detecting the line of sight employed in these proposals are mostly by irradiating the eyeball of the photographer with infrared light and calculating the rotation angle of the eyeball utilizing the Purkinje's first image which is the corneal reflected image and the central position of the pupil or the iris, thereby determining the direction of the line of sight.

Such method of detecting the line of sight is disclosed for example in the Japanese Patent Laid-Open Application No. 61-172552, and its application to a camera is disclosed for example in the Japanese Patent Laid-Open Application No. 2-5.

The method disclosed in the former patent application consists of irradiating the eyeball of the observer with a parallel infrared light beam from a position on the optical axis of an observation optical system and detecting the Purkinje's first image and the center of the pupil, thereby detecting the direction of the line of sight.

However, while the Purkinje's first image can be detected with a light source of a relatively low illumination intensity, the detection of the boundary between the pupil and the iris requires the illumination with a light source of a relatively high illumination intensity. For this reason it has been difficult to efficiently detect the Purkinje's first image and the boundary between the pupil and the iris if there is employed a same light source for both illuminations, particularly a light source providing an illuminating light beam substantially parallel to the optical axis of the observation optical system.

SUMMARY OF THE INVENTION

In consideration of the foregoing, the sight line detecting device of the present invention provided with illumination means for illuminating the eye of the photographer and photoelectric conversion means for photoelectrically converting the light reflected from said eye illuminated by said illumination means, wherein said illumination means comprises a first light source for detecting the corneal reflected image of the eye, and a second light source for detecting the boundary between the pupil and the iris of the eye or the boundary between the iris and the white of the eye.

The use of the second light source for detecting the boundary between the pupil and the iris, or between the iris and the white of the eye, as well as the first light source for detecting the corneal reflected image, allows illumination of the respective objects with optimum illumination intensities, thereby efficiency detecting the position of the Purkinje's first image and the central position of the pupil, and calculating the direction of the line of sight.

DETAILED DESCRIPTION OF THE PREFERRED EMBODIMENTS

Now the present invention will be clarified in detail by the preferred embodiments thereof shown in the attached drawings.

Figure 1:
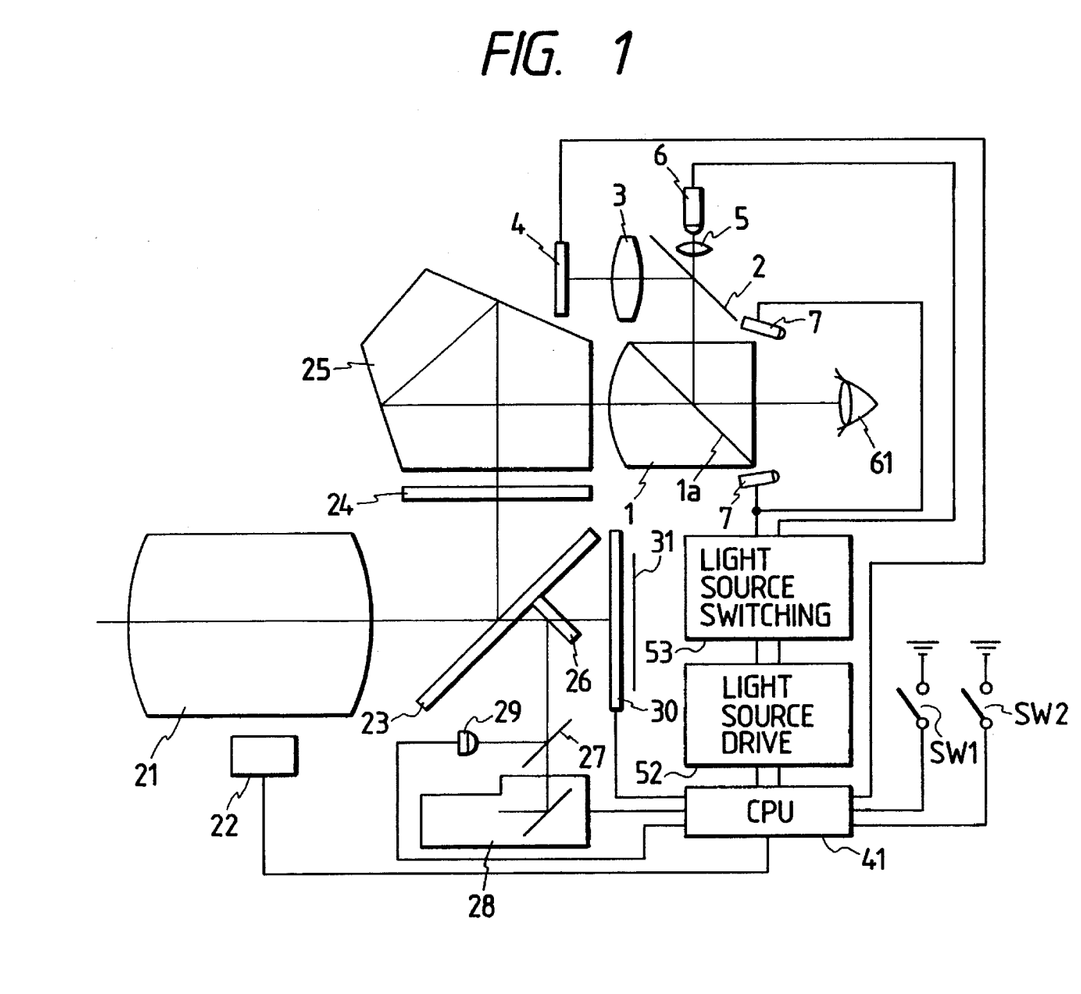
FIG. 1 is a schematic view of a camera with a sight line detecting device constituting a first embodiment of the present invention, including the optical system of said camera.
Figure 2:
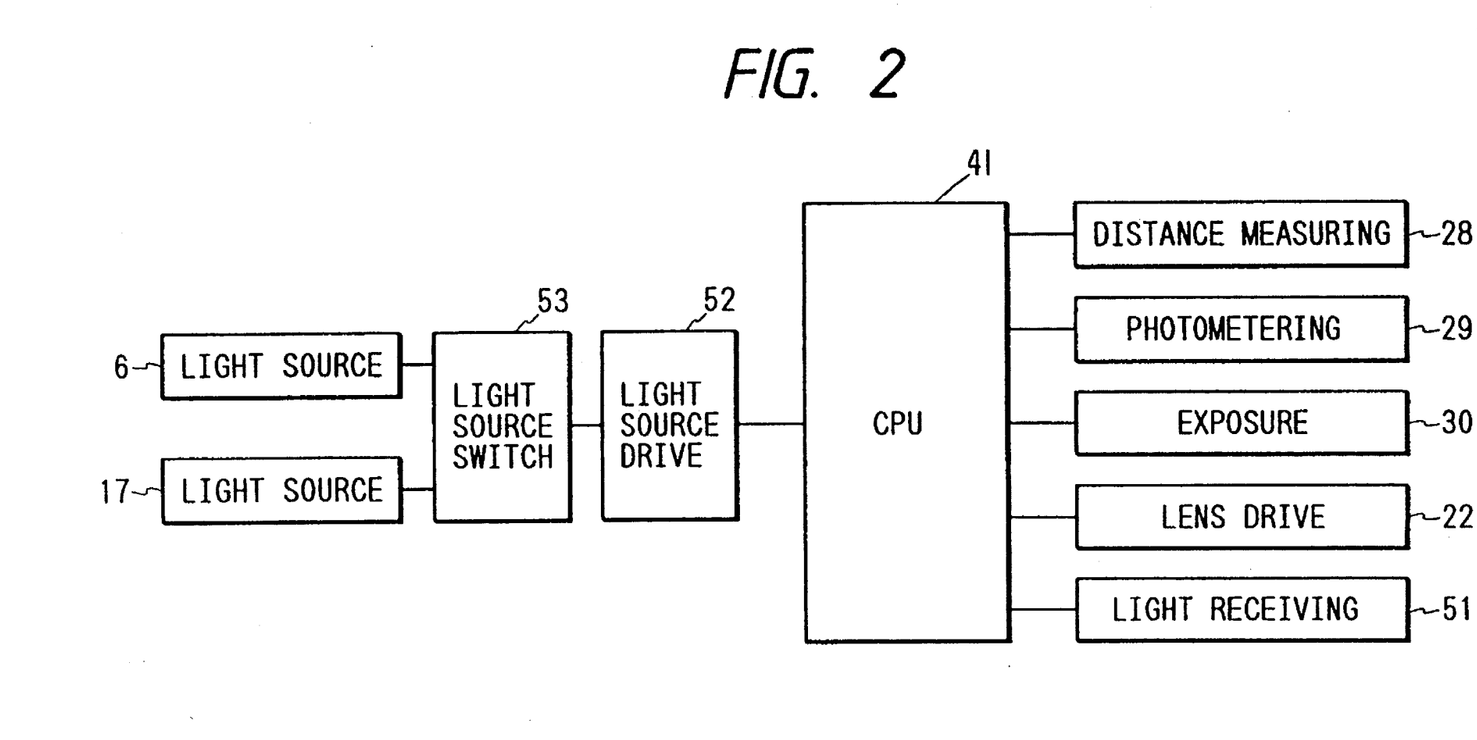
FIG. 2 is a block diagram of the camera with the sight line detecting device, of the first embodiment of the present invention.

FIG. 1 is a view of a camera provided with a device for detecting the line of sight constituting a first embodiment of the present invention, including the optical system, and FIG. 2 is a block diagram of said first embodiment.

Referring to FIG. 1, the light coming from an object and transmitted by a phototaking lens 21 is split by a main mirror 23 toward a finder screen 24 and also toward a photographic film 31. The latter is further deflected by a sub mirror 26 toward a distance measuring unit 28. The light to said distance measuring unit 28 is partly deflected by a half mirror 27 toward a light metering unit 29. On the other hand, the light guided by the main mirror 23 toward the finder screen 24 is focused thereon. The image of the object thus focused is guided through a pentagonal prism 25 and an eyepiece lens 1 to the eye 61 of the photographer.

Now referring to FIGS. 1 and 2, a control unit (CPU) 41 controls the entire system of the camera with the sight line detecting device of the first embodiment.

Figure 6:
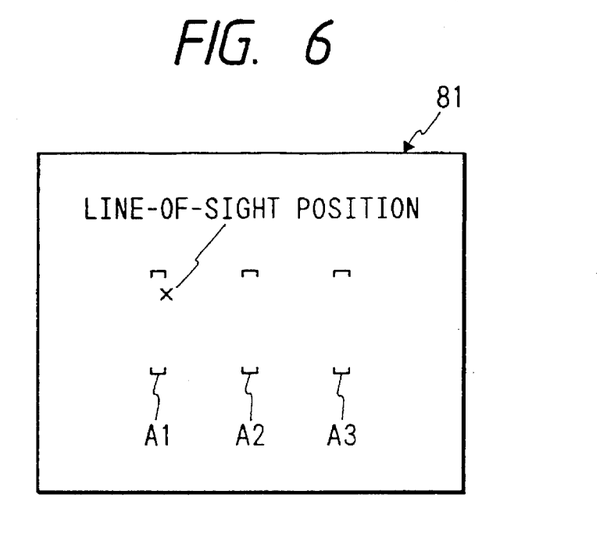
FIG. 6 is a view of an AF area in the view finder.

A distance measuring unit 28 effects distance measurement in each of plural distance measuring areas A1, A2, A3 in a view finder 81 as shown in FIG. 6. In this embodiment there are provided discrete distance measuring areas, but a continuous distance measuring area may also be employed.

A light metering unit 29 effects light metering in each of plural divided light metering areas provided in the view finder 81.

An exposure unit 30 effects an exposure operation based on a control signal from the control unit 41.

A lens driving unit 21 drives the phototaking lens 21 according to the instruction from the control unit 41.

A light receiving unit 51 receives the light for detecting the line of sight, and, in response to the output signal therefrom, the control unit 41 detects the position of the Purkinje's first image and the central position of the pupil and calculates the direction of the line of sight, based on said positions.

A light source driving unit 52 drives the light source for detecting the line of sight, and turns on and off the light source according to the instruction from the control unit 41.

A light source switching unit 53 switches light sources 6, 7 according to the instruction from the control unit 41.

The light source 6 for detecting the Purkinje's first image, connected to and controlled by the control unit 41, emits an infrared light beam, is transmitted by a projection optical system 5, then is deflected by a light splitting face 1a of the eyepiece lens 1 toward the eye 61 of the photographer and irradiates said eye 61 as a light beam substantially parallel to the optical axis. Said light splitting face 1a constitutes a dichroic mirror which transmits the visible light but reflects the infrared light.

The light from the light source 6, after reflection by the eye 61, is deflected toward the light source by the light splitting face 1a in the eyepiece lens 1, then further deflected by the half mirror 2, is transmitted by a receiving optical system 3 and reaches a photosensor 4, consisting of a one- or two-dimensional array of photoelectric converting elements. Said photosensor 4 is positioned conjugate with the vicinity of the pupil of the eye 61 of the photographer with respect to the receiving optical system 3, whereby the corneal reflected image of the eye 61 of the photographer, namely the Purkinje's first image, is formed on said photosensor. The photosensor 4 is connected to the control unit 41, to which supplied, therefore, is the output signal of said photosensor 4.

A light source 7 consists of plural infrared light-emitting elements, arranged around the eyepiece lens 1 for directly illuminating the eye 61, for detecting the boundary between the pupil and the iris or for forming the image of the eye 61. Said light source 7 is also connected to and is controlled by the control unit 41. Said light source 7 directly illuminates the eye 61 of the photographer, without the projection optical system as in the case of the light source 6.

The image of the boundary between the pupil and the iris or the image of the eye 61, formed by said light source 7, is also formed on the photosensor 4, as in the case of the Purkinje's first image formed by the light source 6. The signal of said eye image is also supplied to the control unit 41. The arrangement of the light source 7 will be explained in more details later.

A half-stroke switch SW1 is connected to the control unit 41 and is turned on by a half-stroke depression of a shutter release button.

A full-stroke switch SW2 is connected to the control unit 41 and is turned on by a full-stroke depression of the shutter release button.

Figure 3:
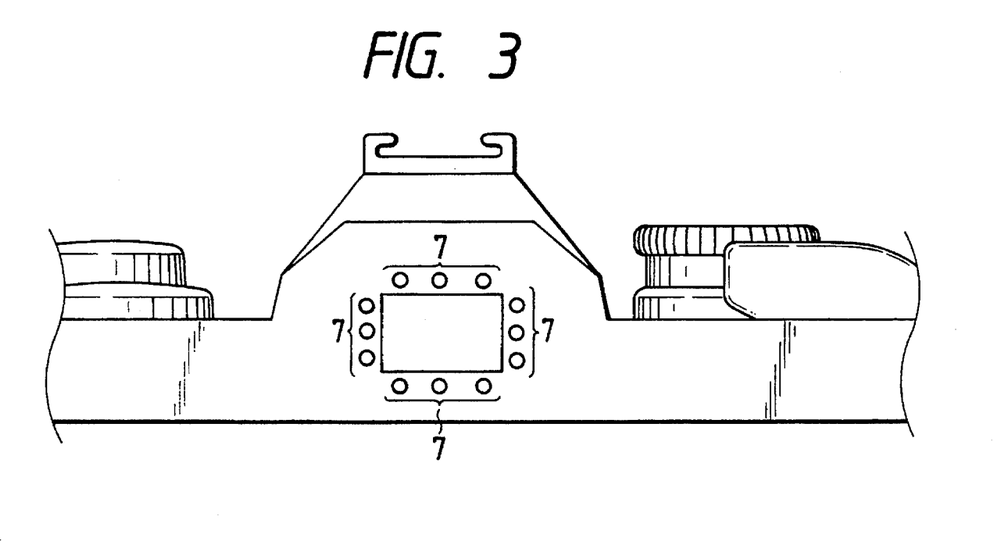
FIG. 3 is a view showing the arrangement of light sources 7 for illuminating the eye 61 of the photographer, in the first embodiment.
Figure 4:
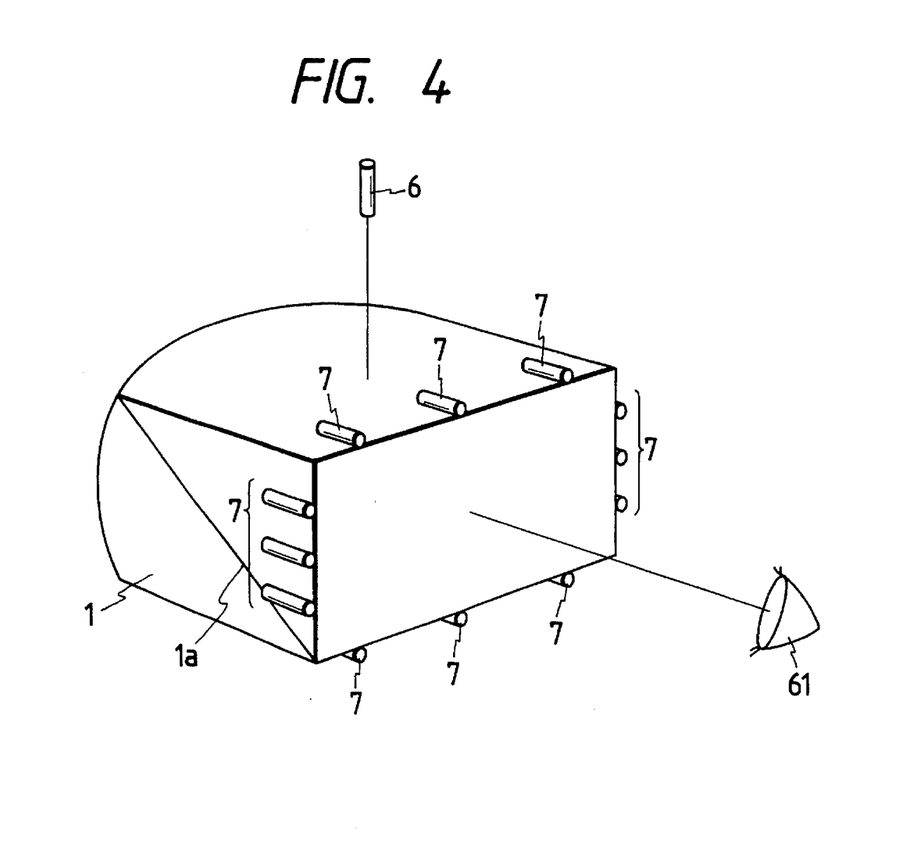
FIG. 4 is a perspective view of an eyepiece lens 1 and the vicinity thereof, in the first embodiment.

FIG. 3 shows an example of the arrangement of the light source 7, and FIG. 4 is a perspective view thereof.

As shown in FIGS. 3 and 4, plural light sources 7 are arranged around the eyepiece lens 1.

As explained in the foregoing, there are provided the light source 6 for detecting the Purkinje's first image and the light source 7 for illuminating the boundary between the pupil and the iris, for illuminating the Purkinje's first image and the boundary between the pupil and the iris with respectively optimum illumination intensities, whereby the position of the Purkinje's first image and the central position of the pupil can be efficiently detected for calculating the direction of the line of sight.

In certain situations, however, it is difficult to distinguish the corneal reflected image by the light source 7 from the Purkinje's first image by the light source 6, so that the corneal reflected image by the light source by the light source 7 is detected and the correct calculation of the direction of the light of sight becomes impossible. In such case, the direction of the line of sight may be calculated by turning on the light sources 6 and 7 alternately, thereby detecting the position of the Purkinje's first image and the central position of the pupil in alternately manner. The details of such light source control will be explained later.

In the following there will be explained the function of the first embodiment of the present invention.

Figure 5:
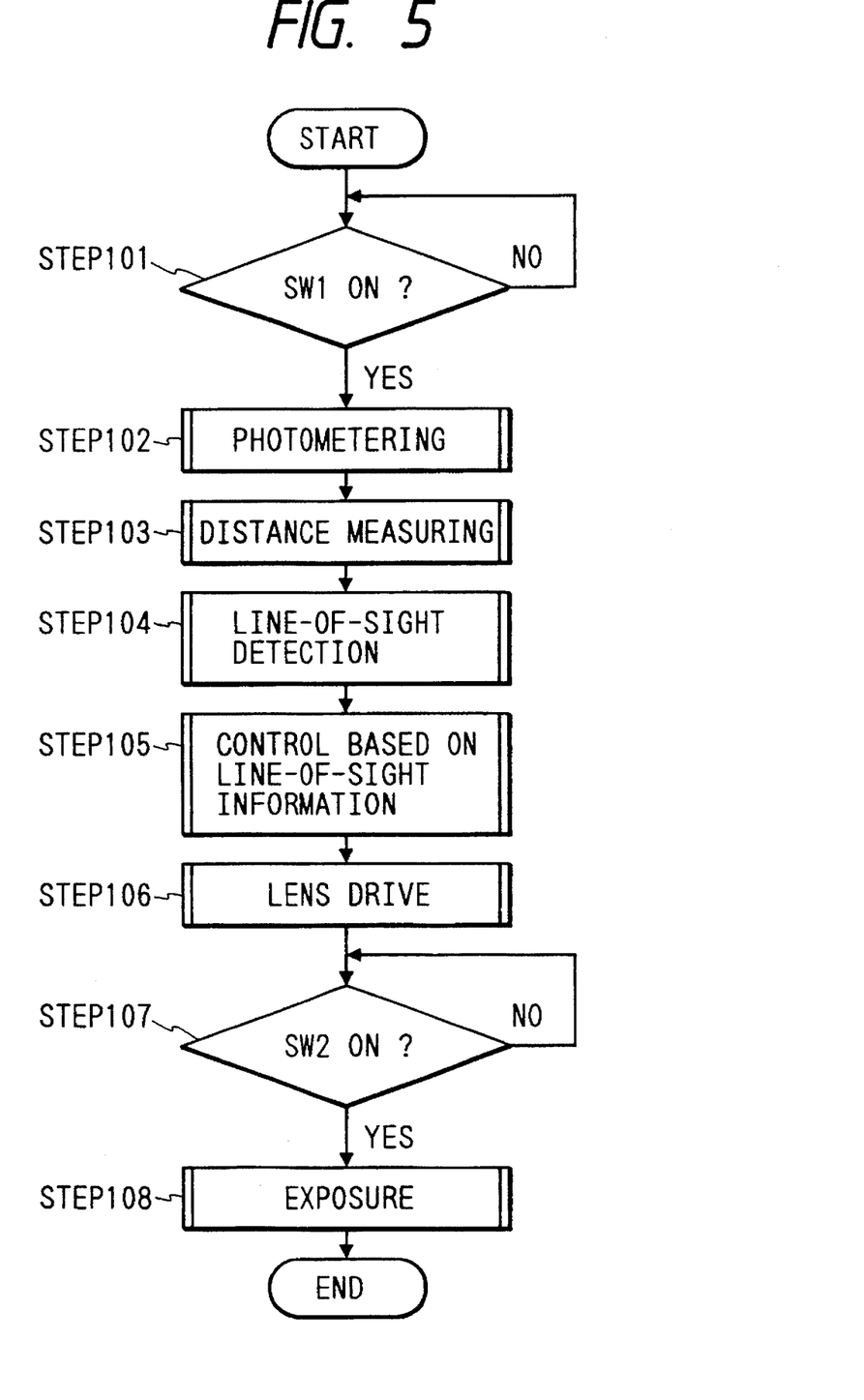
FIG. 5 is a flow chart showing the control sequence of the camera with sight line detecting device of the present invention.

FIG. 5 is a flow chart of the control sequence of the above-explained camera with the sight line detecting device, from the start of power supply to the exposure (shutter release) operation, and said sequence is executed at the start of power supply.

Referring to FIG. 5, a step 101 discriminates whether the half-stroke switch SW1 is closed, and, if closed, the sequence proceeds to a step 102, but, if open, said step 101 is repeated.

A step 102 causes the light metering unit 29 to effect the light metering, and the metered values of the respective areas are stored in a memory in the control unit 41.

A step 103 causes the distance measuring unit 28 to effect the distance measurement for each of the areas A1, A2 and A3 shown in FIG. 6, and the measured values corresponding to said areas are memorized in the memory of the control unit 41.

A step 104 executes a subroutine for detecting the line of sight, of which details will be explained later. In this embodiment, the line of sight is calculated from the position of the Purkinje's first image and the central position of the pupil, as explained in the conventional technology. For example, the position of the line of sight is identified as represented by a mark "x" in FIG. 6.

A step 105 controls the light metering and the distance measurement, based on the direction of the line of sight calculated in the step 104, and utilizing the information obtained in the steps 102 and 103. More specifically, the distance measurement is controlled by a calculation based on the distance measurement information of the area A1, corresponding to the position of the line of sight indicated by the mark "x". Also the light metering is controlled by a weighted averaging with the center of gravity at an area corresponding to the position of the line of sight indicated by said mark "x".

A step 106 causes the lens driving unit 22 to drive the phototaking lens 21, based on the distance measurement information determined in the step 105.

A step 107 discriminates whether the full-stroke switch SW2 is turned on, and, if turned on, the sequence proceeds to a step 108, but, if not, the step 107 is repeated.

A step 108 executes a series of exposing operations including the mirror lifting, the shutter curtain movement, the mirror descent, the film feeding and the shutter charging. The sequence is terminated when the exposure operations are completed. After the completion of the step 108, the sequence may return to the step 101 to repeat the above-explained sequence until the power supply is turned off.

In the following explained is the detection of the line of sight.

Figure 7:
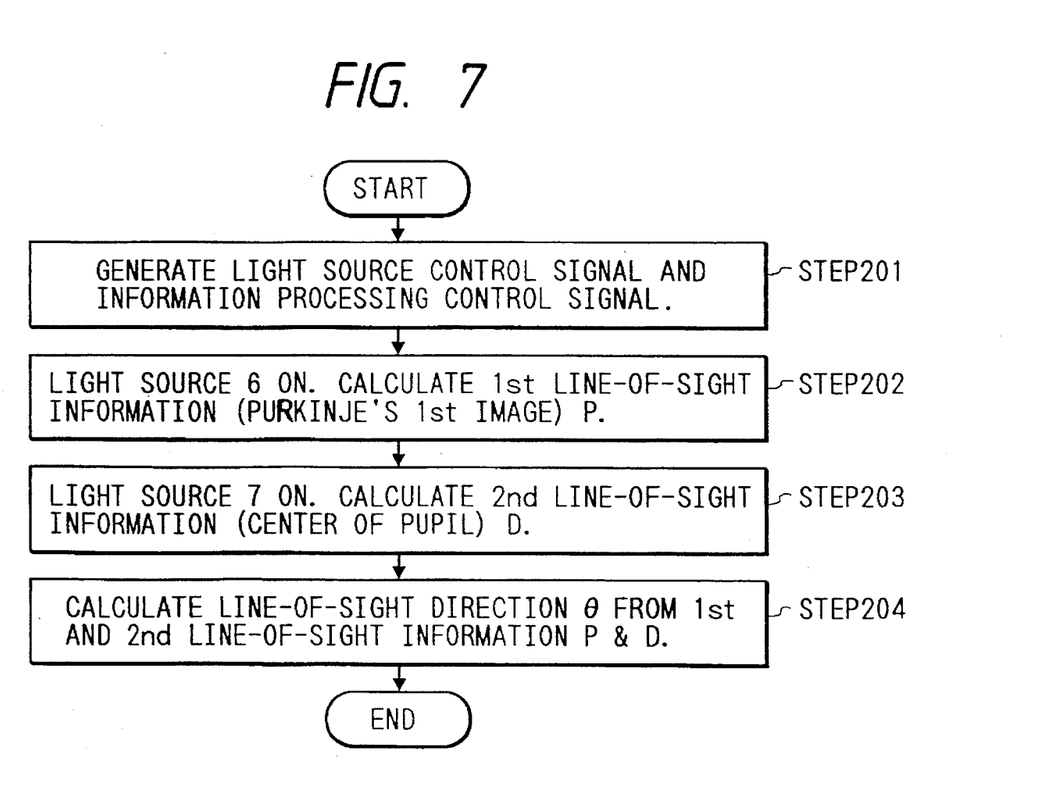
FIG. 7 is a flow chart showing a subroutine for detecting the line of sight.

FIG. 7 is a flow chart showing a subroutine for detecting the line of sight.

Figure 8:
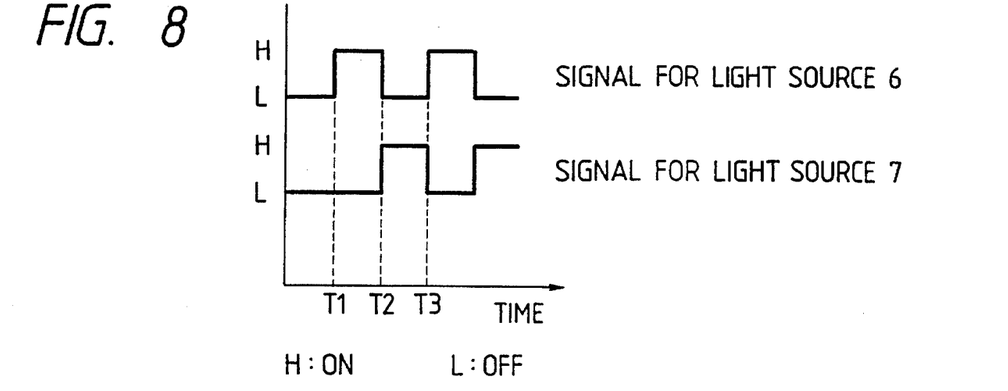
FIG. 8 is a chart showing control signals for light sources 6, 7.

Referring to FIG. 7, a step 201 generates control signals for the light sources 6, 7 as shown in FIG. 8 and a control signal for processing the information from the light receiving unit 51, thereby effecting lighting control of the light sources 6, 7 and the signal processing for the detection of the line of sight. These processes are conducted in the control unit 41. In FIG. 8, the abscissa indicates the elapsed time, and there are shown, at the upper side, a control signal for the light source 6 and for the calculation of the position of the Purkinje's first image, and, at the lower side, a control signal for the light source 7 and the calculation of the central position of the pupil. It is to be noted, however, that the lighting control of the light sources 6, 7 is not limited to the foregoing example, and they may be turned on at the same time.

Figure 9:
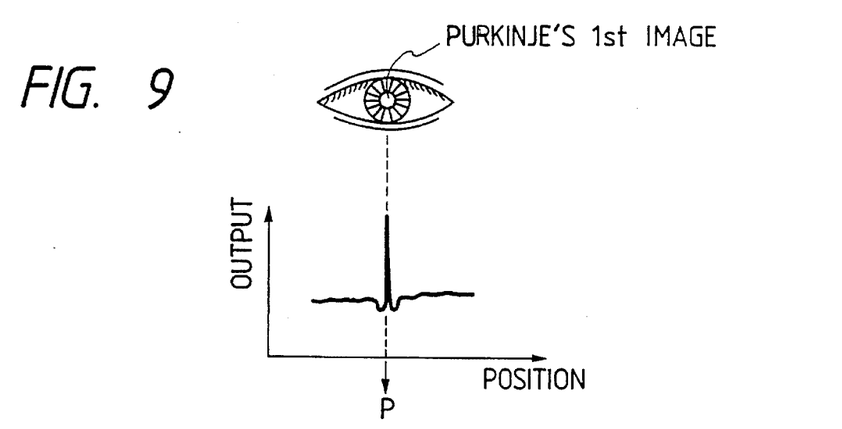
FIG. 9 is a chart showing the output of a photosensor, with respect to the position of the Purkinje's first image.

A step 202 effects the control of the light source 6 and the processing of the information from the light receiving unit 51, based on the signal of the upper side, among the signals generated in the step 201. The lighting of the light source and the calculation of the position of the Purkinje's first image from the signal of the light receiving unit 51 are conducted during the high (H) level state of the signal. The position of the Purkinje's first image can be determined as the position P of peak in the output signal from the light receiving unit 51 as shown in FIG. 9.

Figure 10:
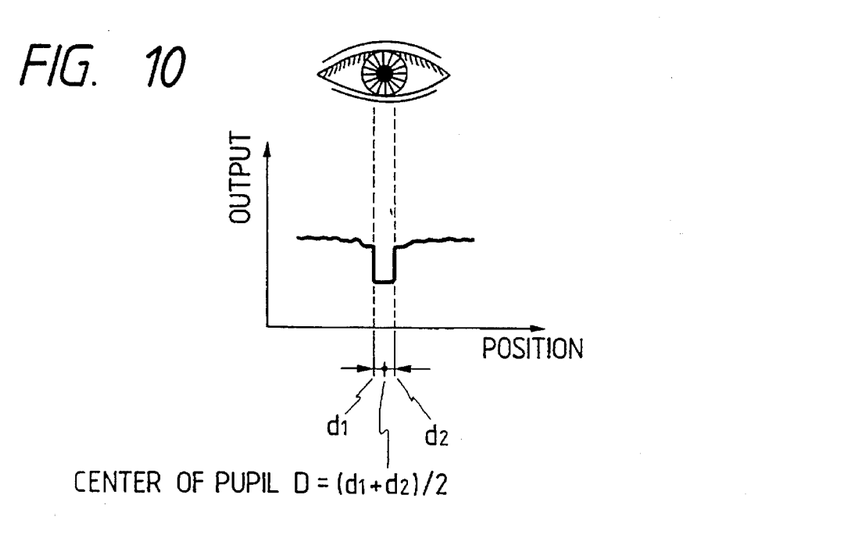
FIG. 10 is a chart showing the output of a photosensor, with respect to the central position of the pupil.

A step 203 effects the control of lighting of the light source 7 and the processing of the information from the light receiving unit 51, based on the signal of the lower side, among those generated in the step 201. The lighting of the light source 7 and the calculation of the central position of the pupil by the information from the light receiving unit 51 are conducted during the high (H) level state of said signal. The central position of the pupil can be determined, from the output signal of the light receiving unit 51 as shown in FIG. 10, as the center D of boundary points d1, d2 defining a reduced output level. The upper and lower control signals are both in the low (L) level state up to a time T1 shown in FIG. 8, so that the detection of the line of sight is not conducted during this period. In a period from T1 to T2, the upper control signal is in the high (H) level state while the lower control signal is in the low (L) level state, so that the light source 6 is turned on to effect the detection of the position of the Purkinje's first image, while the light source 7 is turned off whereby the detection of the central position of the pupil is not conducted. In a period from T2 to T3, the upper control signal is in the low (L) level state while the upper control signal is in the high (H) level state. Consequently the light source 6 is turned off whereby the detection of the position of the Purkinje's first image is not conducted, while the light source 7 is turned on to detect the central position of the pupil. Thereafter the state of T1–T2 and the state of T2–T3 are repeated, and, based these signals, the light source switching unit 53 controls the light sources, whereby the detection of the position of the Purkinje's first image and the detection of the central position of the pupil are executed accordingly.

A step 204 executes the calculation of the direction θ of the line of sight, based on the information P of the position of the Purkinje's first image and the information D on the central position of the pupil determined in the steps 202, 203, according to the following equation:

$$\theta = \sin^{-1}[(D-P)/(A-\rho)]$$

wherein: A: distance from the center of rotation of the eyeball to the center of pupil;

ρ: distance from the center of rotation of the eyeball to the center of curvature of the cornea.

Upon calculation of the direction θ of the line of sight by the foregoing equation, the subroutine for the detection of the line of sight is terminated.

Figure 11:
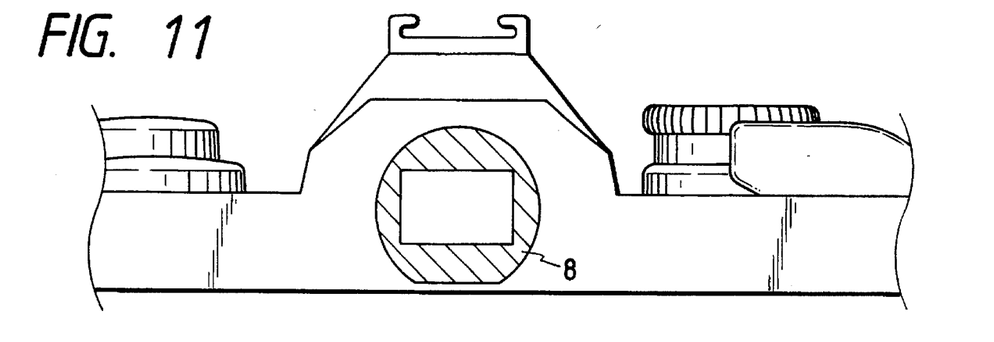
FIG. 11 is a view showing a second embodiment.
Figure 12:
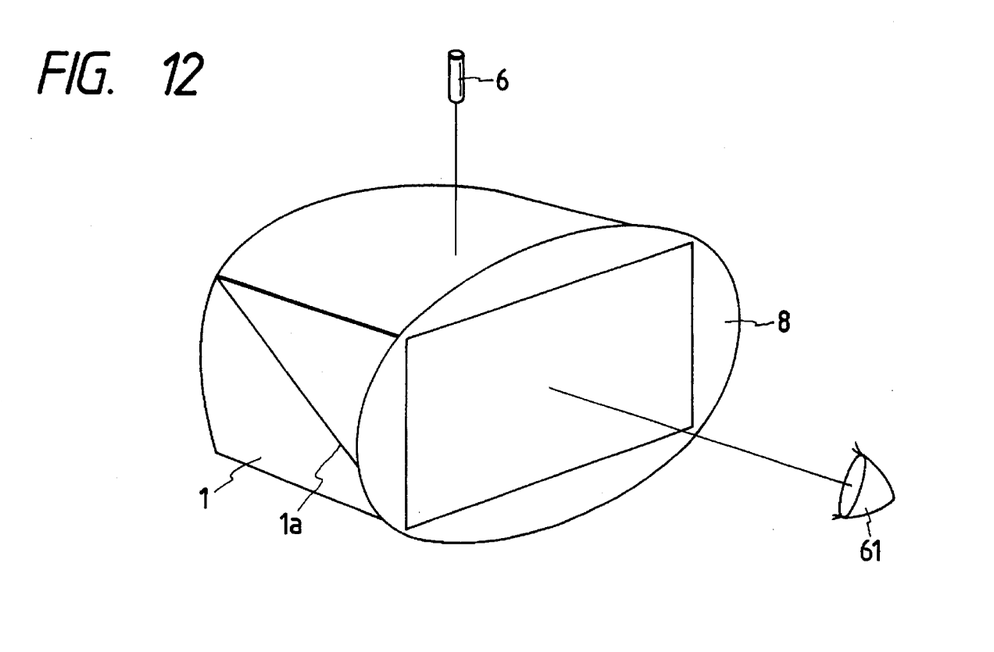
FIG. 12 is a perspective view of an eyepiece lens 1 and its vicinity in the second embodiment.

FIG. 11 illustrates a 2nd embodiment, and FIG. 12 is a perspective view of the peripheral part of the eyepiece lens 1 in the present embodiment. In this 2nd embodiment, a diffusing plate (ground glass or opal glass) 8 is provided between the light source 7 and the eye 61. When the light source 7 is turned on, the emitted light beam is diffused by the diffusing plate 8 and illuminates the eye 61. Such illumination of the boundary of the pupil and the iris with the diffused light reduces the intensity of the corneal reflected image by the light source 7, thereby facilitating the detection of the boundary of the pupil and the iris. Also the corneal reflected image by the light source 7 and the Purkinje's first image by the light source 6 can be distinguished easily, so that the detection of the position of said Purkinje's first image by the light source 6 and the detection of the central position of the pupil by the light source 7 can be conducted at the same time. It is also possible to calculate the direction of the line of sight more accurately, by turning on the light sources 6, 7 alternately thereby detecting the position of the Purkinje's first image and the central position of the pupil as in the first embodiment.

Figure 13:
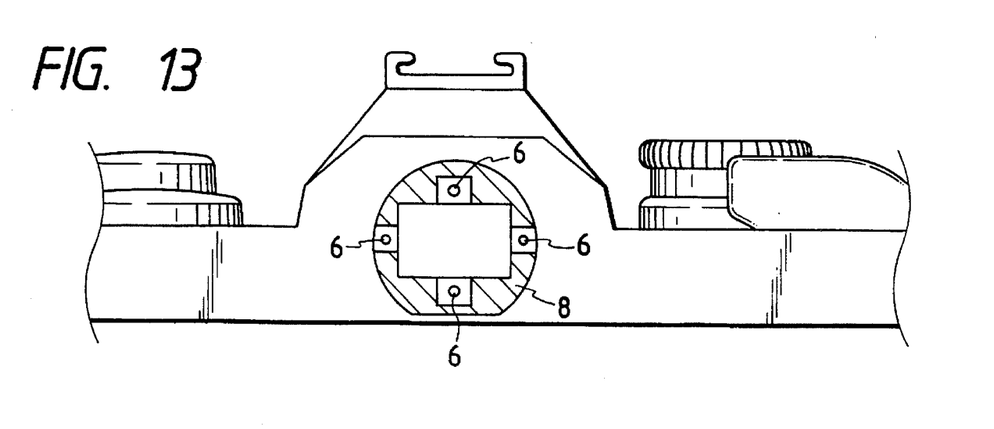
FIG. 13 is a view showing a third embodiment.
Figure 14:
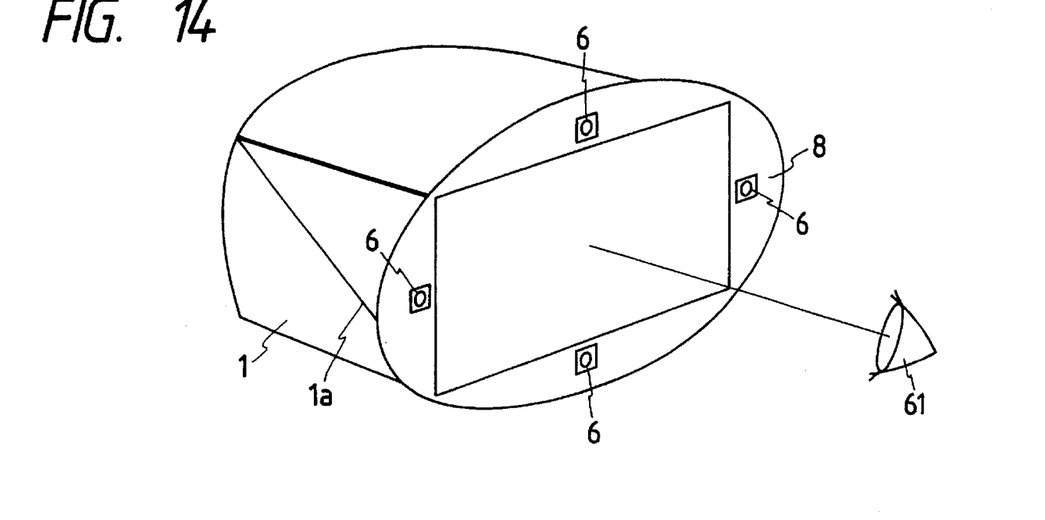
FIG. 14 is a perspective view of an eyepiece lens 1 and its vicinity in the third embodiment.

In a 3rd embodiment, as shown in FIG. 13, parts of the diffusing plate are opened, and light sources 6 are positioned therebehind. FIG. 14 is a perspective view of the peripheral part of the eyepiece lens 1 in this embodiment. In this case the sight line detecting optical system, split from the observing optical system by the light splitting face 1a of the eyepiece lens 1, consists only of the light receiving system 3 and the photosensor 4. Consequently a light splitting face can be dispensed with, and the loss in the amount of light can be reduced. Also since the sight line detecting optical system and the observing optical system do not contain the light source therein, the photosensor 4 is not affected by the ghost image of the light source, and the detection of the position of the Purkinje's first image and of the central position of the pupil can be carried out precisely.

Figure 15:
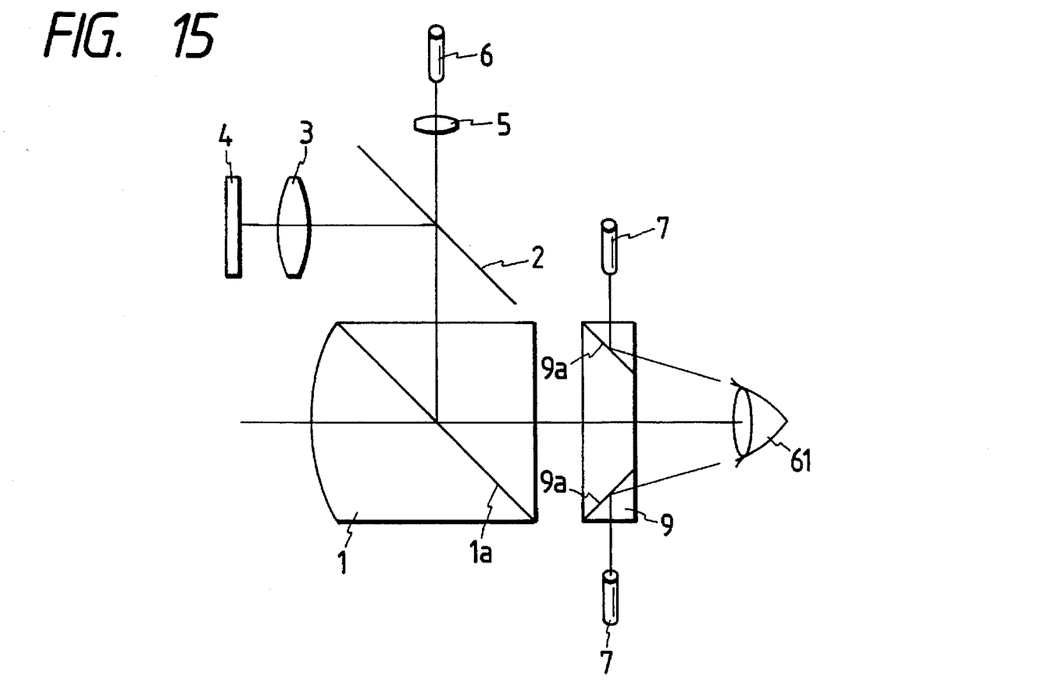
FIG. 15 is a schematic view of a sight line detecting optical system in a fourth embodiment.

FIG. 15 is a schematic view of the sight line detecting optical system in a 4th embodiment. A beam splitter 9 is positioned at a side of the eyepiece lens 1 toward the eye 61, and a light source 7 is provided at a lateral position. When said light source 7 is turned on, the light beam emitted therefrom is introduced into said beam splitter 9, then reflected by a splitting face 9a and illuminates the eye 61. Said light splitting face 9a is composed of a dichroic mirror, transmitting the visible light and reflecting the infrared light.

Figure 16:
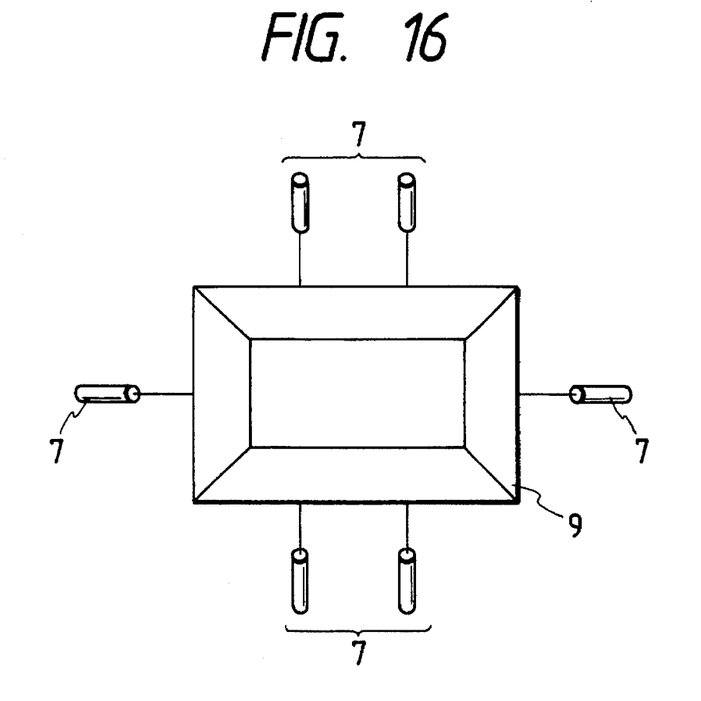
FIG. 16 is a view of a light splitter 9 seen from the side of the eye 61.

FIG. 16 is a view of the beam splitter 9, seen from the side of the eye 61, and shows the relationship of the beam splitter 9 and the light sources 7.

Figure 17:
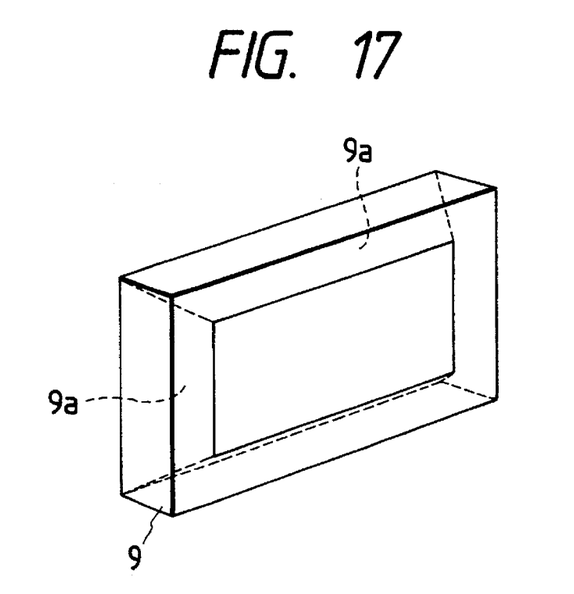
FIG. 17 is a perspective view of the light splitter 9.

FIG. 17 is a perspective view of the beam splitter 9, in which the light splitting face 9a consisting of the dichroic mirror is provided only in the peripheral portion. In contrast to the foregoing embodiments, the present embodiment illuminates the boundary of the pupil and the iris from a direction close to the optical axis of the observing optical system, so that the illuminating light is not eclipsed for example by the eyelid. It is therefore possible to efficiently illuminate the boundary of the pupil and the iris.

Figure 18:
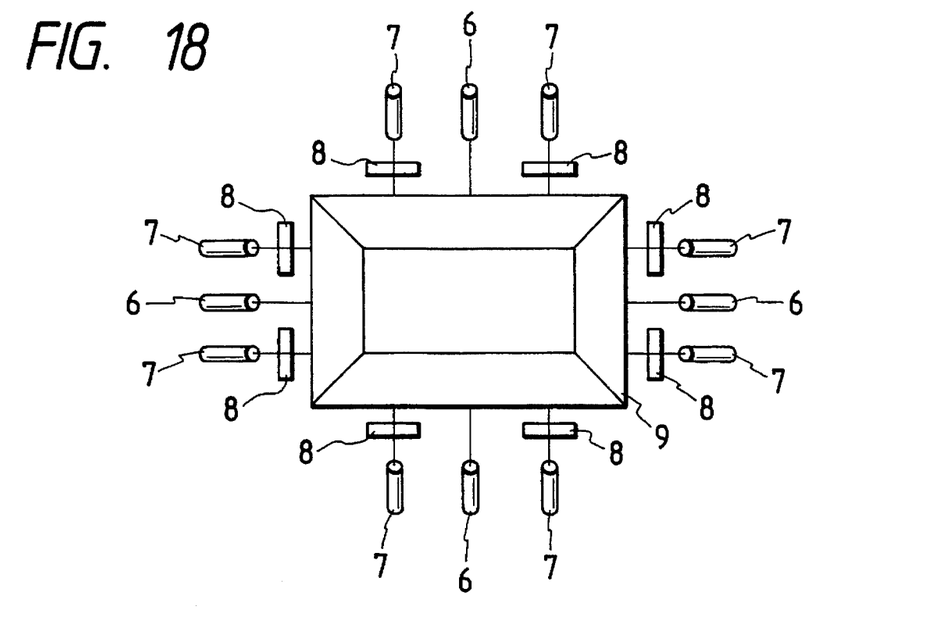
FIG. 18 is a view of the light splitter 9 in a fifth embodiment, seen from the side of the eye 61.

FIG. 18 illustrates a beam splitter 9 of a 5th embodiment, seen from the side of the eye 61, and shows the arrangement of the beam splitter 9, the light sources 6, 7 and the diffusing plate 8. In the present embodiment, as in the 4th embodiment, there are provided the light sources 6, 7, and the diffusing plate 8 is provided in front of the light sources 7.

Figure 19:
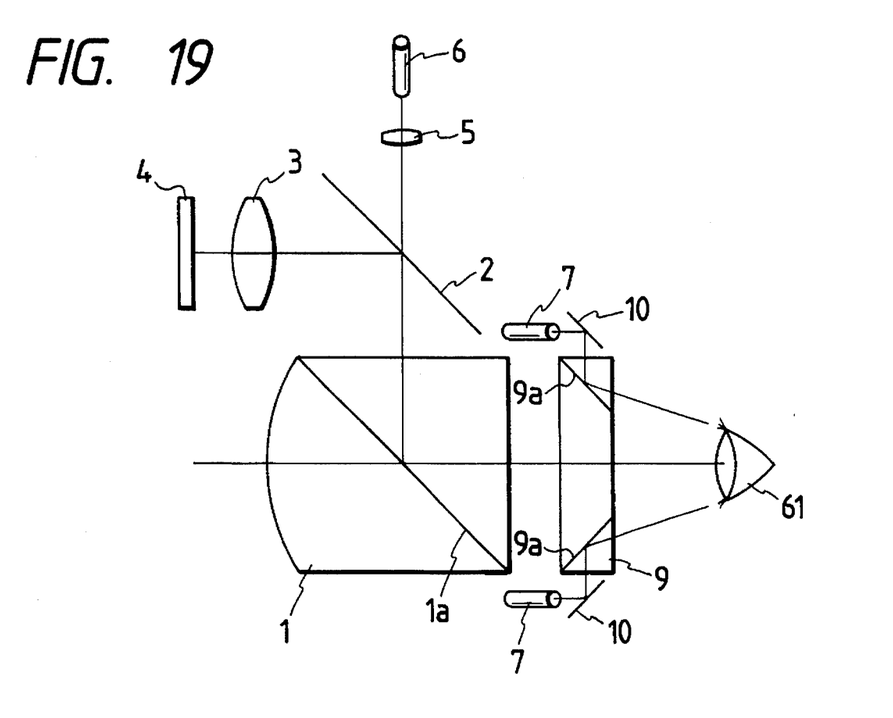
FIG. 19 is a schematic view of a sight line detecting optical system in a sixth embodiment.

FIG. 19 is a schematic view of the sight line detecting optical system in a 6th embodiment. The light from the light sources 7 is diffused and reflected by diffusing/reflecting plates 10, provided at the side of the beam splitter 9, thus enters the beam splitter 9, then is reflected by splitting faces 9a therein and illuminates the eye 61.

Figure 20:
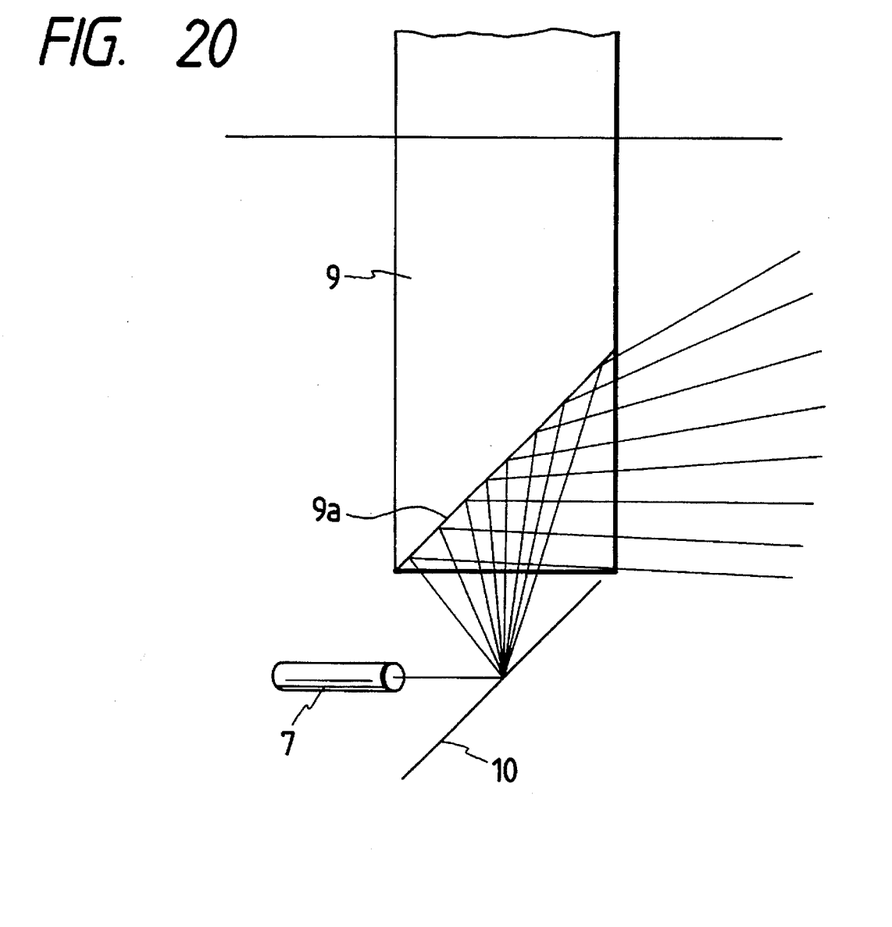
FIG. 20 is a partial magnified view of the sight line detecting optical system in the sixth embodiment.

FIG. 20 is a partial magnified view of the sight line detecting optical system in the present embodiment. Since the light beam from the light source 7 in the present embodiment is better diffused by the diffusing/reflecting plates, the intensity of the corneal reflected image of the light source 7 can be reduced, and the position of the Purkinje's first image and the central position of the pupil can be detected more easily.

Figure 21:
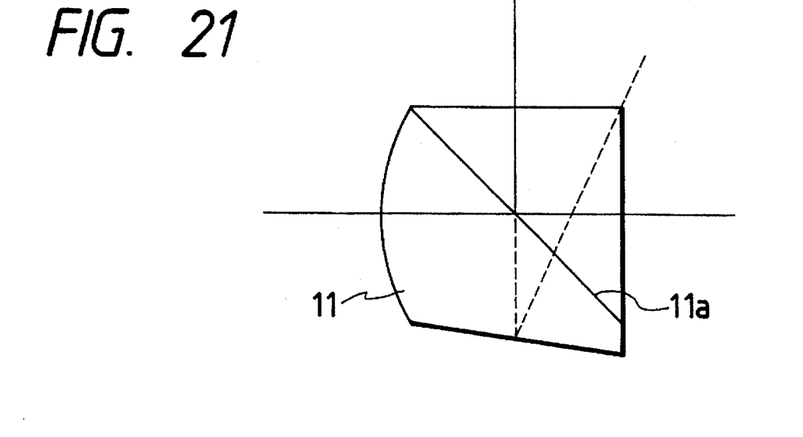
FIG. 21 is a view of an eyepiece lens.

Also in case the light source 6 is positioned above the eyepiece lens 1 as in the 1st, 2nd, 4th and 6th embodiments, the eyepiece lens 1 may be replaced by an eyepiece lens 11 with an inclined lower face as shown in FIG. 21. In this case a part of the light from the light source 6, transmitted by a light splitting face 11a, is reflected by the lower face of the eyepiece lens 11 into a direction different from the photosensor 4, so that the position of the Purkinje's first image and the central position of the pupil can be detected in more accurate manner.

The present invention provides a second light source for detecting the central position of the pupil, thereby enabling to detect the position of the Purkinje's first image and the central position of the pupil in precise manner. It also enables to detect the position of the Purkinje's first image and the central position of the pupil in easier and more precise manner, by alternately turning on the first and second light sources for effecting said detections in alternate manner, or effecting the illumination by the second light source in diffused state.

What is claimed is:

1. A camera with a sight line detecting device provided with illumination means for illuminating an eye of a photographer, and a photoelectric conversion device which photoelectrically converts the light reflected from said eye illuminated by said illumination means, the sight line detecting device detecting a sight line of the photographer based on output from said photoelectric conversion device;

wherein said illumination means includes a first light source for detecting a corneal reflected image of said eye; and a second light source for detecting the boundary between the pupil and the iris of said eye, or the boundary between the iris and the white of said eye with a smaller intensity of a corneal reflected light than that by the first light source.

2. A camera with a sight line detecting device according to claim 1, further comprising light source switch means for switching said first and second light sources.

3. A camera with a sight line detecting device according to claim 1, further comprising diffusion means for diffusing the illuminating light by said second light source.

4. A camera with a sight line detecting device according to claim 2, further comprising diffusion means for diffusing the illuminating light by said second light source.

5. A camera with a sight line detecting device according to claim 1, wherein at least one of the first light source and the second light source of said illumination means is provided around an observation optical system for observing an object, thereby directly illuminating the eye.

6. A camera with a sight line detecting device according to claim 1, wherein at least one of the first light source and the second light source of said illumination means is adapted to illuminate the eye by light splitting means provided between the observing optical system and the eye.

7. A camera with a sight line detecting device according to claim 3, wherein at least one of the first light source and the second light source of said illumination means is adapted to illuminate the eye by light splitting means provided between the observing optical system and the eye.

8. A camera with a sight line detecting device according to claim 6, wherein said light splitting means is an optical member having at least a light splitting face but not having the refractive force.

9. A camera with a sight line detecting device according to claim 7, wherein said light splitting means is an optical member having at least a light splitting face but not having the refractive force.

10. A camera with a sight line detecting device according to claim 1, comprising an observation optical system for observing an object and an aperture portion disposed between said observation optical system and said eye, one of the first light source and the second light source of said illumination means being provided along the sides of the aperture portion of the observing optical system.

11. A camera with a sight line detecting device according to claim 2, comprising an observation optical system for observing an object and an aperture portion disposed between said observation optical system and said eye, one of the first light source and the second light source of said illumination means being provided along the sides of the aperture portion of the observing optical system.

12. A camera with a sight line detecting device provided with an illumination device for illuminating an eye of a photographer, and a photoelectric conversion device which photoelectrically converts the light reflected from said eye illuminated by said illumination device, the sight line detecting device detecting a sight line of the photographer based on output from said photoelectric conversion device;

wherein said illumination device includes a first light source for detecting a corneal reflected image of said eye; and a second light source for detecting the boundary between the pupil and the iris of said eye, or the boundary between the iris and the white of said eye with a smaller intensity of a corneal reflected light than that by the first light source.

13. A sight line detecting device provided with illumination means for illuminating an eye of a photographer, and a photoelectric conversion device which photoelectrically converts the light reflected from said eye illuminated by said illumination means, the sight line detecting device detecting a sight line of the photographer based on output from said photoelectric conversion device;

wherein said illumination means includes a first light source for detecting a corneal reflected image of said eye; and a second light source for detecting the boundary between the pupil and the iris of said eye, or the boundary between the iris and the white of said eye, with a smaller intensity of a corneal reflected light than that by the first light source.

14. A sight line detecting device according to claim 13, further comprising light source switch means for switching said first and second light sources.

15. A sight line detecting device according to claim 13, further comprising diffusion means for diffusing the illuminating light by said second light source.

16. A sight line detecting device according to claim 14, further comprising diffusion means for diffusing the illuminating light by said second light source.

17. A sight line detecting device according to claim 13, wherein at least one of the first light source and the second light source of said illumination means is provided around an observation optical system for observing an object, thereby directly illuminating the eye.

18. A sight line detecting device according to claim 13, wherein at least one of the first light source and the second light source of said illumination means is adapted to illuminate the eye by light splitting means provided between an observing optical system and the eye.

19. A sight line detecting device according to claim 15, wherein at least one of the first light source and the second light source of said illumination means is adapted to illuminate the eye by light splitting means provided between an observing optical system and the eye.

20. A sight line detecting device according to claim 18, wherein said light splitting means is an optical member having at least a light splitting face but not having a refractive force.

21. A sight line detecting device according to claim 18, wherein said light splitting means is an optical member having at least a light splitting face but not having a refractive force.

22. A sight line detecting device according to claim 13, comprising an observation optical system for observing an object and an aperture portion disposed between said observation optical system and said eye, one of the first light source and the second light source of said illumination means being provided along the sides of the aperture portion of the observation optical system.

23. A sight line detecting device according to claim 14, comprising an observation optical system for observing an object and an aperture portion disposed between said observation optical system and said eye, one of the first light source and the second light source of said illumination means being provided along the sides of the aperture portion of the observation optical system.

24. A sight line detecting device provided with an illumination device for illuminating an eye of a photographer, and a photoelectric conversion device which photoelectrically converts the light reflected from said eye illuminated by said illumination device, the sight line detecting device detecting a sight line of the photographer based on output from said photoelectric conversion device;

wherein said illumination device includes a first light source for detecting a corneal reflected image of said eye; and a second light source for detecting the boundary between the pupil and the iris of said eye, or the boundary between the iris and the white of said eye, with a smaller intensity of a corneal reflected light than that by the first light source.

* * * * *

UNITED STATES PATENT AND TRADEMARK OFFICE
CERTIFICATE OF CORRECTION

PATENT NO. : 5,491,532
DATED : February 13, 1996
INVENTOR(S) : Fumio SUZUKI, et al.

It is certified that error appears in the above-indentified patent and that said Letters Patent is hereby corrected as shown below:

Column 10, line 1 (claim 21) "claim 18" should be --claim 19--.

Signed and Sealed this

Sixteenth Day of July, 1996

Attest:

BRUCE LEHMAN

Attesting Officer     Commissioner of Patents and Trademarks